Figure 1:
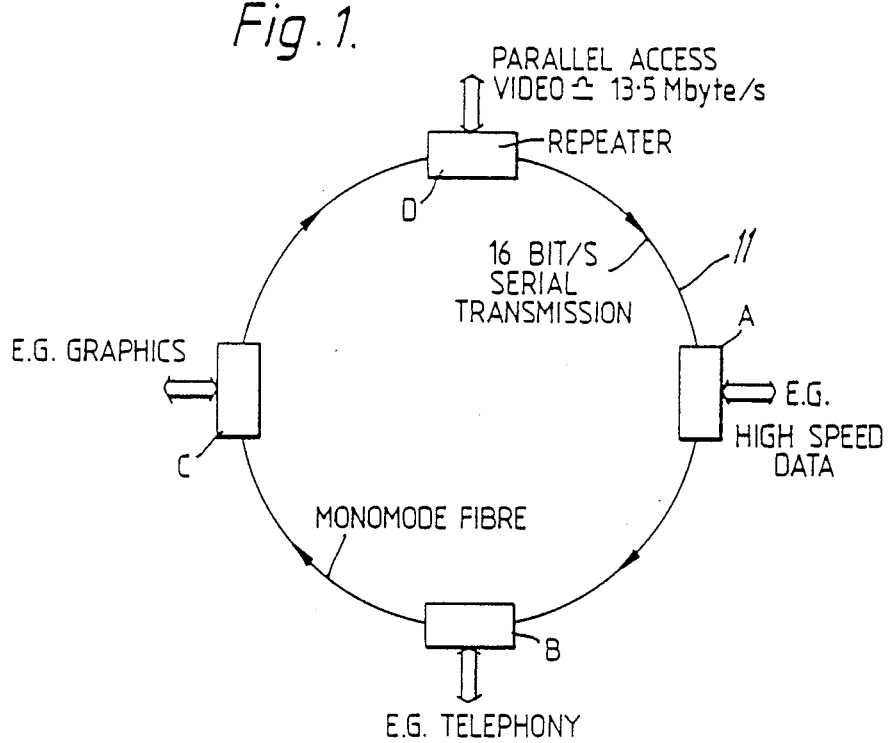

United States Patent [19]

Cassidy et al.

[11] Patent Number: 4,976,505
[45] Date of Patent: Dec. 11, 1990

[54] OPTICAL SWITCH USING DIRECTIONALLY FLEXIBLE OPTICAL FIBRES

[75] Inventors: Stephen A. Cassidy; Peter Yennadhiou, both of Ipswich, England

[73] Assignee: British Telecommunications public limited company, United Kingdom

[21] Appl. No.: 279,159

[22] PCT Filed: Mar. 31, 1988

[86] PCT No.: PCT/GB88/00261

§ 371 Date: Nov. 21, 1988

§ 102(e) Date: Nov. 21, 1988

[87] PCT Pub. No.: WO88/07696

PCT Pub. Date: Oct. 6, 1988

[30] Foreign Application Priority Data

Apr. 2, 1987 [GB] United Kingdom ................. 8707852

[51] Int. Cl.$^5$ .............................................. G02B 6/26
[52] U.S. Cl. ................................. 350/96.15; 350/96.20
[58] Field of Search ............... 350/96.12, 96.13, 96.14, 350/96.15, 96.20

[56] References Cited

U.S. PATENT DOCUMENTS 4,493,528 1/1985 Shaw et al. ..................... 350/96.15
4,798,435 1/1989 Fujiwara et al. ................. 350/96.13
4,805,038 2/1989 Seligson ....................... 350/96.15 X

FOREIGN PATENT DOCUMENTS 8601907 3/1986 PCT Int'l Appl. .............. 350/96.14

Primary Examiner—John D. Lee
Attorney, Agent, or Firm—Nixon & Vanderhye

[57] ABSTRACT

An optical switch which selectively transmits or does not transmit light from an input optical fibre (10) to an output optical waveguide (11,12) has one of the input (10) and output (11,12) optical waveguides an optical fibre which is flexible and mounted to be capable of movement towards and away from the other, and an electrode (14) arranged to subject the one optical waveguide to an electrostatic field. In use, application of an electrical potential to the electrode (14) causes the one optical waveguide to move in a direction to enable or prevent optical coupling between the waveguides and hence operation of the switch. The optical fibre is a D-fibre so that it is more flexible in that direction is providing the fibre with a degree of self-alignement. It is preferred that the one optical waveguide is entirely electrically non-conducting and that the optical switch includes more than one electrode (14) to provide a non-uniform electrostatic field. In this case the one optical waveguide is caused to move towards the region of highest electrostatic field density and so move towards or away from the other waveguide to enable or prevent optical coupling between them.

16 Claims, 1 Drawing Sheet

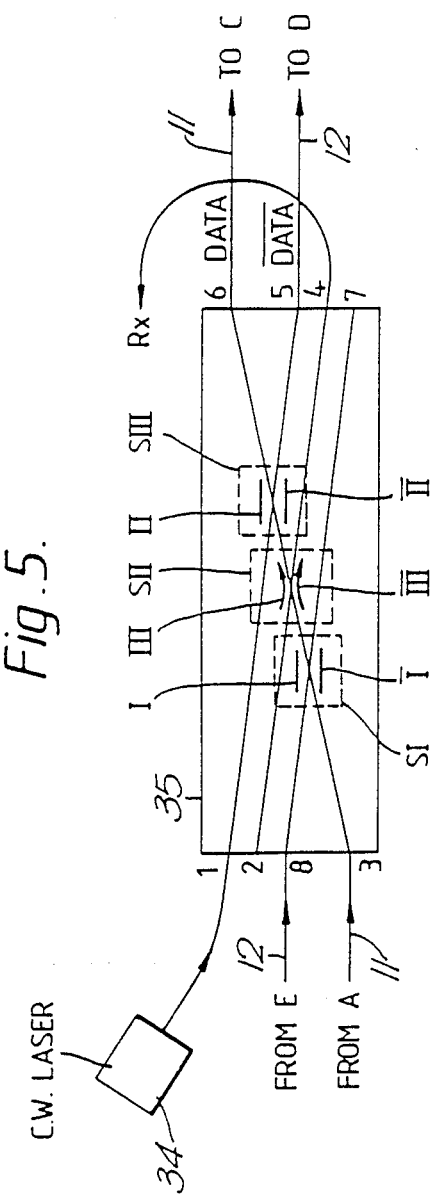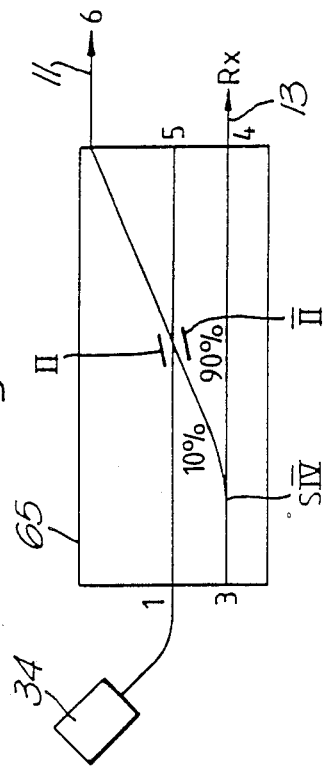

OPTICAL SWITCH USING DIRECTIONALLY FLEXIBLE OPTICAL FIBRES

This invention relates to an optical switch and in particular, but not exclusively, to optical cross-point switches using D cross-section optical fibres.

An optical switch selectively transmits or does not transmit light from an input optical waveguide to an output optical waveguide. In the past various proposals and attempts have been made to provide such switches by interposing a material having selectively variable optical properties between the input and output optical waveguide so that light from the input optical waveguide can be selectively coupled to the output optical waveguide by selectively changing the properties of the material upon the application of an electrical field to it.

Another approach is to form a cross-point switch by locating a pair of optical fibres so that they cross each other diagonally but slightly apart. The optical fibres are chosen such that when they are pressed together an optical signal travelling in one fibre is coupled to the other, i.e. switched from the one optical fibre to the other. This is exemplified by the arrangements shown in the Patent Abstracts of Japan Vol 7, no. 168 (P-212)(1313) 23rd July 1983 (abstract of JP-A-58 199 304) and in the Patent Abstracts of Japan Vol 7, no. 196 (P-219)(1314) Aug. 26th 1983 (abstract of JP-A-58 95 701).

It is known to employ an electrostatic field to deflect an optical fibre supported at only one end so that the free end is moved into or out of abutting alignment with another optical fibre, the alignment being achieved by a V-groove into which the fibre is deflected as, for example in GB 1,598,334.

According to this invention an optical switch comprises an input and an output optical waveguide, one of which is an optical fibre mounted to be capable of movement towards and away from the other, and an electrode arranged to subject the one optical waveguide to an electrostatic field whereby application of an electrical potential to the electrode causes the optical fibre to move in a direction to enable or prevent optical coupling between the waveguides and hence operation of the switch, the optical fibre having a cross-section such that it is most flexible in said direction.

Because the fibre in the switch according to the present invention is most flexible in the direction of movement into and out of coupling relationship with the other waveguide it is less likely to be deflected laterally by the electrostatic field than a symmetrical optical fibre thereby reducing the strict tolerances required during manufacture.

The input and output optical waveguides may be biased towards one another so that the switch is biased into the ON state and then be operated and turned OFF when an electrical potential is applied to the electrodes to move the one optical waveguide away from the other. However, more usually, the input and output optical waveguides are biased away from one another so that the switch is biased into the OFF state and is then turned ON by the application of an electric potential to the electrode to move the input and output optical waveguides together.

The one optical fibre may have an electrically conducting coating and have an electrical potential applied to it so that it is attracted towards or repelled by the electrode. However, it is preferred that the one optical waveguide is entirely electrically non-conducting and the optical switch includes more than one electrode to provide a non-uniform electrostatic field, the one optical waveguide being caused to move towards the region of highest electrostatic field density and so move towards or away from the other waveguide to enable or prevent optical coupling between them. In this case the one optical waveguide may be coated with a material having a high dielectric constant, for example a polymer material such as poly acrylonitride, phenolic resin, elastomers, celluloid, and nylon.

The optical switch may include two or more output waveguides and, in this case, the switch by movement of the one optical waveguide between the two or more output waveguides is capable of establishing coupling between the input waveguide and a selected one of the output waveguides. The input and output waveguides may be arranged end-to-end so that they are generally aligned and so that the optical switch is turned ON by precisely aligning and butt coupling the input and output optical waveguides. When the waveguides are not precisely aligned they are not butt coupled and so the switch is turned OFF. This arrangement is especially useful for a multipole switch having a number of output optical waveguides which are fixed in position and an input optical waveguide which is flexible and mounted to be capable of movement so as to be aligned and butt coupled with each of the output optical waveguides in dependence upon the electrical potential applied to the electrode or electrodes. With this arrangement optical signals from the input optical waveguide can be routed to a selected one of the different output optical waveguides in dependence upon the applied electrical potential.

Alternatively the input and output optical waveguides are arranged generally side-by-side and the input and output optical waveguides are coupled together by an overlap between them and by the waveguides being put into contact or, at least close proximity, in their overlapping region.

The one optical waveguide may conveniently be formed by D-optical fibres. A D-fibre is a clad fibre in which the cladding on one side of the core is considerably reduced in thickness and this may be done by polishing away the cladding from the one side of the fibre to provide the fibre with a D-shaped cross-section. When the generally flat faces of two D-optical fibres are overlapped and brought into close proximity coupling takes place between the cores of the two fibres so that light from the core of the input fibre is transferred to and propagated in the core of the output fibre. A D-fibre can also be used in conjunction with a planar waveguide for example in a lithium niobate substrate. It will be appreciated that other cross-sections giving most flexibility in the switching direction may alternatively be employed.

Typically when two optical fibres are used, the other of the optical fibres is supported along its length so that its position is fixed in space while the one of the fibres is only supported at one end, or at both ends so that it is free to move in space into and out of contact with the other fibre. Both the one and the other fibre may be only supported by their ends but, in this case, there is preferably a difference in tension between them so that, when they are both influenced by the electrostatic field relative movement occurs between the two fibres to bring them substantially into contact with one another. D-optical fibres have a different bending moment in the plane containing their flat face and the axis of the fibre from that in the plane which is normal to the flat face and also contains the axis of the fibre due to the non-circular cross-section. This means that the fibre is more flexible when bending in the plane normal to its flat face and less flexible when bending in a plane containing its flat face. Thus, by arranging for the movement caused by the electrostatic field to bend the fibre in the plane normal to its flat face the fibre tends to maintain its position in a direction transverse to its direction of movement which is a useful feature in the production of a practical optical switch. This feature may also be used by arranging the optical fibres on a curved path which ensures that they are correctly orientated with respect to one another with their flat faces towards one another.

Preferably a number of switches in accordance with this invention are arranged together in the form of a cross-point array. In this arrangement each input of the cross-point array may be coupled via a number of input waveguides to a number of optical switches the output fibres from which are each taken to a separate output of the cross-point array. However, in this case it is preferred that each input optical waveguide overlaps each and every one of the output optical waveguides with separate electrodes being provided at each crossing point so that, by applying an electrical potential to the electrodes associated with one crossing point the optical switch formed by that particular crossing point is operated.

Preferably the electrodes are formed by an interdigitated array of separate electrodes with electrical potentials of different polarity being applied to adjacent electrodes in the array. With this arrangement any charge which is present on the optical waveguide has no net effect on the movement of it. The movement is solely a function of the non-uniformity of the electrostatic field which, due to the interaction of charges induced on the surface of the optical waveguide with the non-uniform field generates a translational force which moves the optical waveguide towards the region of highest field density. Preferably the electrodes do not contain any sharp edges to reduce the effects of charges sprayed from the electrodes onto the optical waveguides and, for this reason the electrodes in each array may be formed as spheres the diameters of which are optimised to produce the required degree of non-uniformity of the electrostatic field and the minimum spraying of charge or as elongate electrodes aligned generally parallel to the fibres and having a square or rectangular cross-section with rounded edges.

Figure 2:
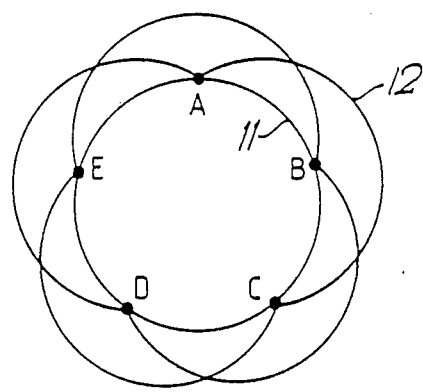
Figure 3:
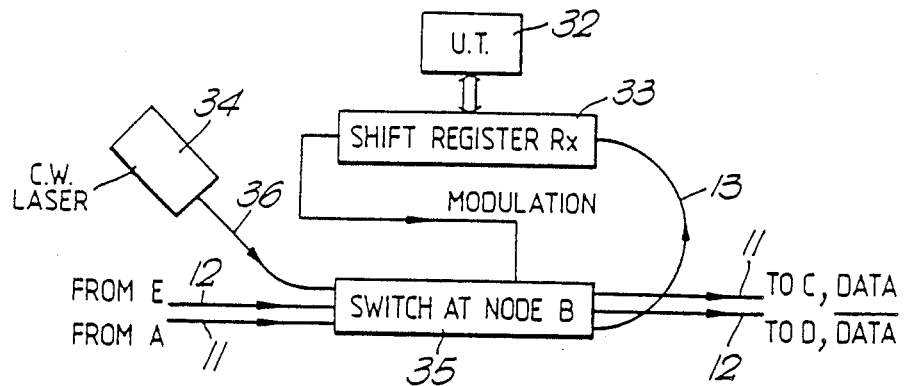
Figure 4:
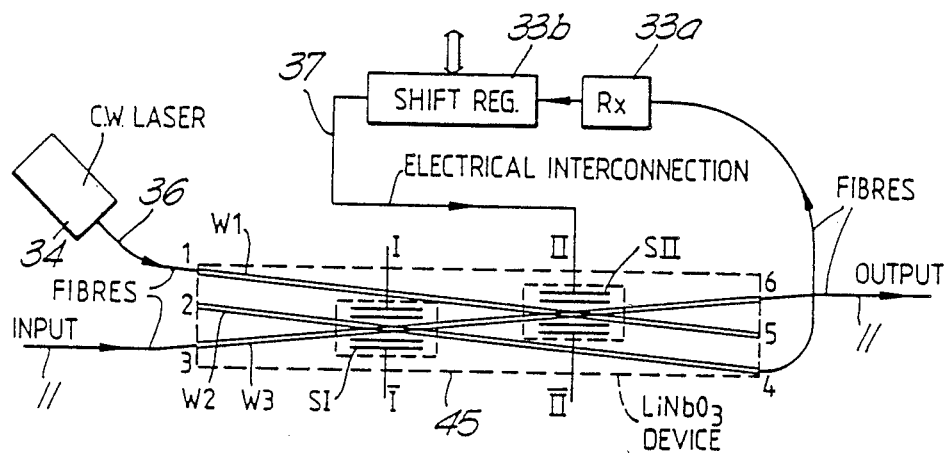
Figure 7:
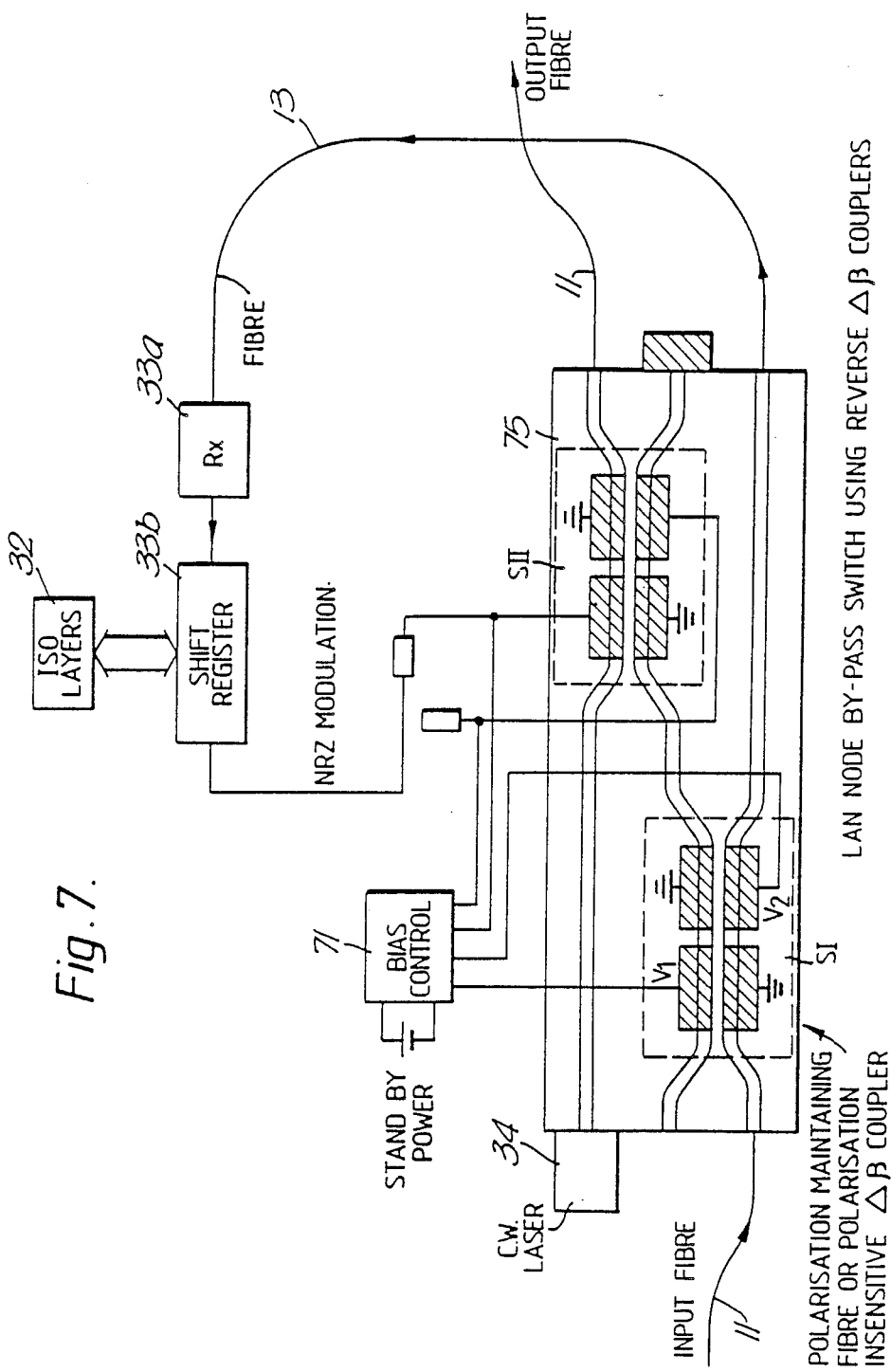

Particular examples of an optical switch in accordance with this invention will now be described with reference to the accompanying drawings, in which:

FIG. 1 is an enlarged plan view of the geometry of a cross-point between two D-fibres with the angle between two fibres grossly exaggerated; and FIG. 2 is a plan of part of a cross-point optical switch array using D-fibres.

To obtain optical coupling between two D-fibres 1 and 2 an overlap between cores 3 and 4 of the fibres should have an axial extent of around 5 mm for typical standard telecommunication grade fibre having a cladding diameter of 125 $\mu$m a core diameter of 8 $\mu$m and a refractive index difference between core and cladding of 0.004. This condition implies an angle A between the fibres of around 0.2° and a separation between the cores of around 0.5 $\mu$m. If the separation between the cores is increased to around 10 $\mu$m substantially no coupling takes place between the fibres. This core overlap leads to a fibre overlap of around 75 mm. These basic parameters form a mechanically actuated cross-point between two D-fibres leading to a practical design for a cross-point switch shown in FIG. 2. The use of an optical fibre most flexible in the coupling direction is that the crucial dimension, the core overlap length is better maintained during switching.

FIG. 2 has been simplified by not showing the fibre cores to reduce confusion and shows only one input fibre 10 and two output fibres 11 and 12. However, in practice there would usually be an equal number of input and output fibres and typically ten of each. The fibres 10, 11 and 12 are anchored at fibre support points 13 which are spaced in the axial direction of the fibres at a separation of around twice the fibre overlap and thus, typically around 150 mm. The input fibres 10 rest on a support (not shown) so that they are held in position. The fibres 11 and 12 are merely fixed at the support points 13 and held away from the fibres 10 so that they are free to move under the influence of an electric field. An array of electrodes 14 are provided around each crossing point. In each array alternate electrodes are connected to sources of electrical potential of opposite polarity. The array of electrodes 14 leads to a highly non-uniform electrostatic field being provided at the cross-point. The whole device is immersed in a refractive index matching oil having a refractive index close to that of the fibres. This ensures good optical coupling between the fibres 10 and 11 and 12 when they are moved together. The low frequency dielectric constant of the fluid (oil or other suitable fluid) should be low since the effect depends on the difference in dielectric constant between the movable fibre and the surrounding fluid. In this case the fibre will be preferentially attracted towards the electrodes. Alternatively, the fluid can have a high dielectric constant compared to the movable fibre and the effect of the electrostatic field will then be to preferentially attract the fluid to the electrode so displacing the fibre.

It may be advantageous to apply to the electrodes an alternating voltage of a frequency greater than the mechanical resonance frequency of the fibre to substantially eliminate the effect of stray charges on the fibre and in the dielectric fluid.

In use, if it is required to couple light appearing on the input fibre 10 with, for example, the output fibre 11, the electrodes 14 surrounding the crossing point between these two fibres have electric potentials applied to them which moves the fibre 11 into contact with the fibre 10 so that light from the fibre 10 is coupled into the fibre 11. Equally, if it is desired to couple the input fibre 10 with the output fibre 12 the electrodes 14 around the crossing point between the fibres 10 and 12 have electrical potentials applied to them which moves the fibre 12 into contact with the fibre 10 and again couples the fibres together so that light from the fibre 10 is transferred to the fibre 12.

We claim:

1. An optical switch comprising:
    an input and an output optical waveguide, one of which is an optical fibre mounted to be capable of movement towards and away from the other, and
    an electrode arranged to subject the one optical waveguide to an electrostatic field whereby application of an electrical potential to the electrode causes the optical fibre to move in a direction to enable or prevent optical coupling between the waveguides and hence operation of the switch, the optical fibre having a cross-section such that it is more flexible in said direction than in other directions.

2. An optical switch as claimed in claim 1 in which the input and output optical waveguides are arranged generally side-by-side where the input and output optical waveguides are coupled together by an overlap between them and by the waveguides being put into contact or, at least close proximity, in their overlapping region.

3. An optical switch as claimed in either of claims 1 and 2, in which the optical waveguides are formed by D-optical fibres.

4. An optical switch according to claims 1 or 2, in which the other of the optical fibres is supported along its length so that its position is fixed in space while the movable fibre is only supported at one position.

5. An optical switch according to claims 1 or 2, in which the movable of the optical fibres is supported by supports at two positions with said fibre movable between the positions.

6. An optical switch according to 1 or 2, in which the input and output optical waveguides are biased away from one another so that the switch is biased into the OFF state and is then turned ON by the application of an electric potential to the electrode to move the input and output optical waveguides together.

7. An optical switch according to claims 1 or 2, in which the movable optical waveguide is entirely electrically non-conducting and the optical switch includes more than one electrode to provide a non-uniform electrostatic field, the movable optical waveguide being caused to move towards the region of highest electrostatic field density and so move towards or away from the other waveguide to enable or prevent optical coupling between them.

8. An optical switch according to claims 1 or 2, which includes two or more output waveguides and, in which, the switch by movement of the movable optical waveguide between the two or more output waveguides is capable of establishing coupling between the input waveguide and a selected one of the output waveguides.

9. An optical switch as claimed in either claim 1 or 2 in which the electrode is formed by an interdigitated array of separate electrodes with electrical potentials of different polarity being applied to adjacent electrodes in the array.

10. An optical switch according to claim 9, in which the electrodes have rounded edges to reduce the effects of charges sprayed from the electrodes onto the optical waveguide.

11. An optical switch as claimed 1 or 2, in which the electrical potential alternates at a frequency greater than the resonant frequency of the fibre.

12. A cross-point array comprising a number of switches in accordance with claims 1 or 2.

13. A cross-point array according to claim 12, in which each input optical waveguide overlaps each and every one of the output optical waveguides with separate electrodes being provided at each crossing point so that, by applying an electrical potential to the electrodes associated with one crossing point the optical switch formed by that particular crossing point is operated.

14. An optical switch comprising:
at least one input optical waveguide and at least one output optical waveguide, at least one of said waveguides being flexibly movable with respect to another of said waveguides into and out of an optical coupling relationship;
said flexibly movable waveguide(s) being capable of flexible movement and having a non-circular cross section which produces a preferential path of flexible waveguide motion into and out of said optical coupling relationship.

15. An optical switch comprising:
at least one input optical waveguide and at least one output optical waveguide, at least one of said waveguides being movable with respect to another of said waveguides into and out of an optical coupling relationship;
said movable waveguide(s) having a non-circular cross section which produces a preferential path of motion into and out of said optical coupling relationship;
said movable waveguide being entirely electrically non-conducting, and further including electrostatic field generating means having a plurality of electrodes to provide a non-uniform electrostatic field, said preferential path of motion being directed toward a region of increasing electrostatic field density.

16. A method for accurately positioning relatively movable input or output optical waveguides with respect to one another in a crosspoint array of optical switches formed at the crosspoint overlaps of said waveguides, said method comprising the steps of:
providing said optical waveguides with non-circular cross sections having a preferred path of transverse flexure with respect to each other; and
generating and applying an electrostatic field to at least one selected crosspoint intersection of said waveguides to move at least one of said waveguides along said preferred path thereby affecting a change in optical coupling between the waveguides located at such selected crosspoint.

* * * * *

UNITED STATES PATENT AND TRADEMARK OFFICE
CERTIFICATE OF CORRECTION

Page 1 of 2

PATENT NO. : 4,976,505

DATED : December 11, 1990

INVENTOR(S) : Stephen A. Cassidy, et. al.

It is certified that error appears in the above-identified patent and that said Letters Patent is hereby corrected as shown below:

The Title page should be deleted to appear as per attached Title page Delete all four sheets of drawings containing Figures 1-7; and insert new drawing sheet 1 containing Figures 1 and 2 as follows:

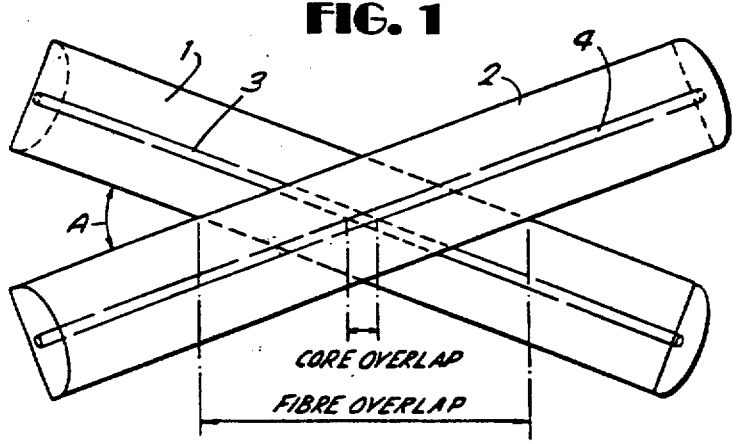

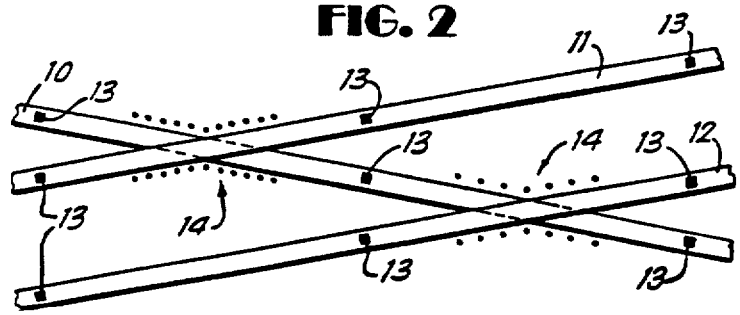

Signed and Sealed this

Twenty-fifth Day of May, 1993

Attest:

MICHAEL K. KIRK

*Attesting Officer*    Acting Commissioner of Patents and Trademarks

United States Patent [19]

Cassidy et al.

[11] Patent Number: 4,976,505
[45] Date of Patent: Dec. 11, 1990

[54] OPTICAL SWITCH USING DIRECTIONALLY FLEXIBLE OPTICAL FIBRES

[75] Inventors: Stephen A. Cassidy; Peter Yennadhiou, both of Ipswich, England

[73] Assignee: British Telecommunications public limited company, United Kingdom

[21] Appl. No.: 279,159
[22] PCT Filed: Mar. 31, 1988
[86] PCT No.: PCT/GB88/00261
  § 371 Date: Nov. 21, 1988
  § 102(e) Date: Nov. 21, 1988
[87] PCT Pub. No.: WO88/07696
  PCT Pub. Date: Oct. 6, 1988

[30] Foreign Application Priority Data

Apr. 2, 1987 [GB] United Kingdom ............... 8707852

[51] Int. Cl.⁵ ............................................. G02B 6/26
[52] U.S. Cl. ............................. 350/96.15; 350/96.20
[58] Field of Search ............... 350/96.12, 96.13, 96.14, 350/96.15, 96.20

[56] References Cited

U.S. PATENT DOCUMENTS 4,493,528  1/1985  Shaw et al. ............... 350/96.15
4,798,435  1/1989  Fujiwara et al. ........... 350/96.13
4,805,038  2/1989  Seligson ................. 350/96.15 X

FOREIGN PATENT DOCUMENTS 8601907  3/1986  PCT Int'l Appl. ........... 350/96.14

Primary Examiner—John D. Lee
Attorney, Agent, or Firm—Nixon & Vanderhye

[57] ABSTRACT

An optical switch which selectively transmits or does not transmit light from an input optical fibre (10) to an output optical waveguide (11,12) has one of the input (10) and output (11,12) optical waveguides an optical fibre which is flexible and mounted to be capable of movement towards and away from the other, and an electrode (14) arranged to subject the one optical waveguide to an electrostatic field. In use, application of an electrical potential to the electrode (14) causes the one optical waveguide to move in a direction to enable or prevent optical coupling between the waveguides and hence operation of the switch. The optical fibre is a D-fibre so that it is more flexible in that direction is providing the fibre with a degree of self-alignement. It is preferred that the one optical waveguide is entirely electrically non-conducting and that the optical switch includes more than one electrode (14) to provide a non-uniform electrostatic field. In this case the one optical waveguide is caused to move towards the region of highest electrostatic field density and so move towards or away from the other waveguide to enable or prevent optical coupling between them.

16 Claims, 1 Drawing Sheet

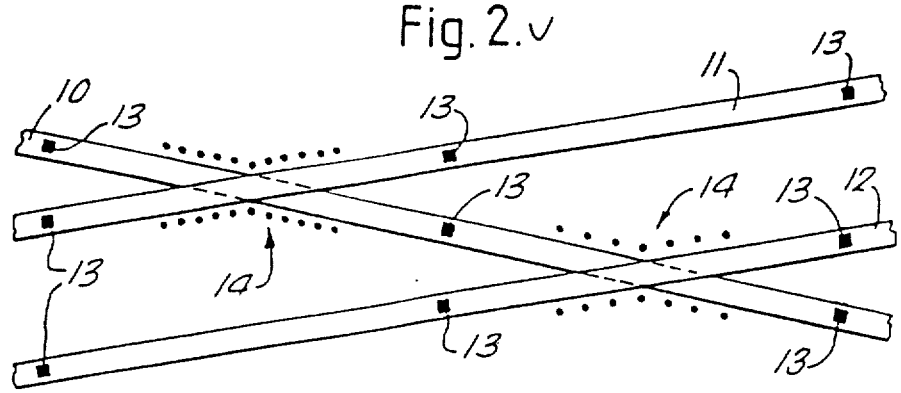

Fig. 2.